United States Patent [19]

Valerio et al.

[11] 4,447,282

[45] May 8, 1984

[54] PROCESS AND EQUIPMENT FOR VENEER PRESS TO GLUE A THIN LAYER ON A VARIOUSLY SHAPED PANEL SURFACE

[76] Inventors: Savorgnan Valerio, via S.Margherita n.42, Tamai (Pordenone), Italy, 33070; Mio Dino, via Centro, 70, Summaga Di Portogruaro, Italy, 30026

[21] Appl. No.: 390,285

[22] Filed: Jun. 21, 1982

[51] Int. Cl.³ ............................................. B29C 17/00
[52] U.S. Cl. .................................. 156/285; 156/212; 156/382; 156/443; 156/216; 156/475; 156/583.3
[58] Field of Search ............... 156/285, 286, 382, 212, 156/216, 213, 443, 475, 583.1, 583.3

[56] References Cited

U.S. PATENT DOCUMENTS 2,151,880  3/1939  Wiederkehr ........................ 156/382
2,671,493  3/1954  Olson ............................. 156/285 X
3,325,329  6/1967  Bolesky ........................... 156/285 X
4,152,188  5/1979  Friedrich ......................... 156/285 X

*Primary Examiner*—David A. Simmons
*Attorney, Agent, or Firm*—Larry J. Palguta; John A. Young

[57] ABSTRACT

Process and apparatus (10) for veneering a thin layer "T" on a support panel "P" by means of an upper plate (2) and lower plate (6). The upper plate (2) supports a support frame (1) for an elastic rubber sheet "G" stretched perimetrically by a stretching system (5) to form an airtight upper chamber "A". Upper chamber "A" and lower chamber "B" are connected with vacuum and pressure means that co-operate with respective inlets/outlets (4,7) between the plates (2,6) to shape under pressure the rubber sheet "G" to the contour of the panel "P" and effect the gluing of veneer "T" thereto.

9 Claims, 7 Drawing Figures

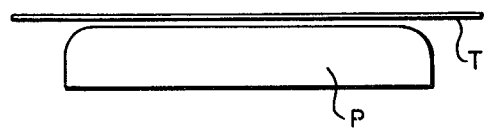
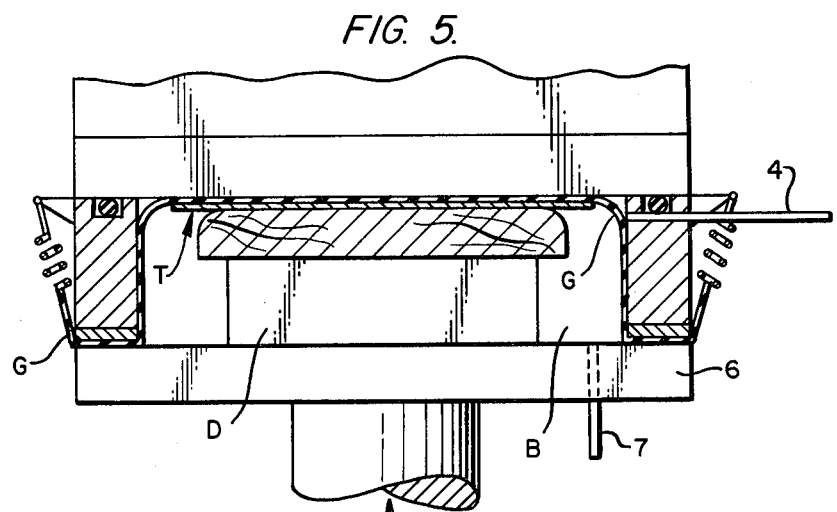
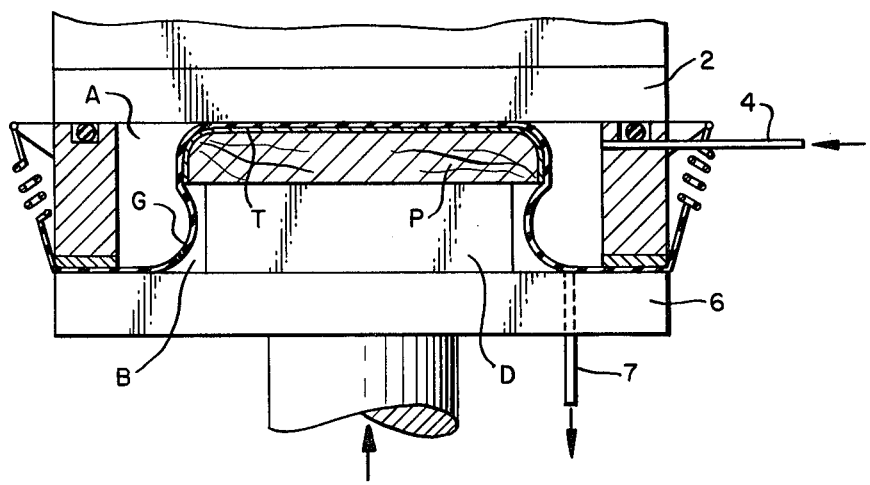

PROCESS AND EQUIPMENT FOR VENEER PRESS TO GLUE A THIN LAYER ON A VARIOUSLY SHAPED PANEL SURFACE

TECHNICAL FIELD

The invention relates to a veneer process and press equipment for veneering thin layers on curved and/or flat surfaces, particularly for the production of panels, as for instance the panels for small doors used in furniture production.

The equipment could be more particularly utilized by well known veneer presses for funiture panel production or be the main apparatus of a specific press for non-flat surfaces.

Therfore, an object of the present invention is the provision of a press having such equipment or system designed to accomplish the novel aspects of the present invention.

BACKGROUND ART

The methods of veneer pressing for effecting a gluing of thin layers, as for instance valuable wood layers, on curve surfaced panels, are well known in the prior art, as for instance the process of pressing with an oil-cushion, as disclosed in Italian patent application No. 83412 A/80, filed on July 28, 1980, entitled: "FLEXIBLE PRESSING PLATE DEVICE AND PRESS PARTICULARLY FOR THE VENEERING OF NON-FLAT PANELS". The use of such a system allows the veneer or layer, through the utilization of a cushion containing a fluid (normally hydraulic oil), to fit perfectly to the shape of the panel and thereby producing the shaping of the veneer on the panel surface, with gluing; but this is a specific solution.

Other well known method of pneumatic veneering are very expensive because the pressing plates have a cushion that is usually heated by using a diathermic oil that requires a long time to get hot. Also, the utilization of pneumatic presses with electric resistance heating plates is not energy efficient, so that several industries are looking for an alternative, simpler, more profitable and efficient method of gluing.

DISCLOSURE OF THE INVENTION

The purpose of the present invention is the realization of a new process of veneering or gluing thin layers on panels having variously shaped surfaces including a flat surface, and furthermore accomplishes the gluing not only on the larger external surface of the panel but also on the perimetrical surfaces by using low-cost equipment in a very efficient, profitable process.

The invention solves the above described problems by utilizing a veneering method combining the effects of fluid pressure and/or a vacuum exerted on a rubber sheet with the pneumatic action of compressed air on one side and the vacuum caused by a vacuum pump on the other side.

In order to accelerate the gluing process, heat is transmitted to the work pieces through the rubber sheet which has been previously heated by contact with the hot surfaces of the pressing plates and the provision of heated compressed air.

The intervention times of the pressures through the available temperatures and materials used (layer thickness, type of rubber, etc.) are regulated by preferably a previously set automatic cycle.

In accordance with the invention, the standard equipment is more particularly constituted by:

a metal frame of a pre-established size, with connecting means to be connected to the upper pressing plates;

a rubber sheet of an adequate thickness and preferably of about 3 mm., heat resistant, whose size is slightly larger than that of the frame to which it has to be hung;

an insulated air bag, with heat-exchanger to be connected to the net of compressed air or to a compressor;

a volumetric vacuum pump;

an electro-valve set;

an electric-pneumatic control board with cycle computer.

The embodiment is to be utilized in a press system as above-described, to carry out the pressing of a panel whose surface is to be covered, after being smeared with glue, with a thin covering, like a valuable wood layer or veneer and pressed between the lower pressing plate and the upper pressing plate of the press with the overhanging interposition of said rubber sheet in cooperation with the action of two opposed chambers. An upper chamber "A" and a lower chamber "B" experience first a vacuum action in the upper chamber "A" in order to retract upwardly and heat the rubber sheet, and by a pressing action and either a vacuum action in the lower chamber "B" or pressure action in the upper chamber "A", portions of the rubber sheet are displaced downwardly to make the rubber sheet conform perfectly to the shape of the panel being covered, simultaneously shaping under pressure the veneer, with the pressure action of the rubber sheet and the heat treatment gluing together the veneer and panel surface.

The main advantages offered by the invention are:

on the standard presses of furniture-makers having a large working area, it is possible to set up several of these apparatuses and thereby effect and increase in production by processing many panels in each plane;

a very low operating cost can be realized because it is possible to heat the press plates sooner with heat sources already existing in the factory (water, oil, etc.), thus eliminating all the negative consequences caused by the use of diathermic oil in the hydraulic cushions, specifically the breaking of cushions which causes the leakage of oil, as it is well known that the breakage of said cusions occurs frequently;

maintenance is reduced to a minimum;

possible breakages of the rubber sheets do not compromise the continuation of work, as it is possible to stop the leak (temporarily) with the application of any patching such as a pad, including, when the breakage concerns the central plane of the sheet, the utilization of an overhanging particle board panel;

it is not necessary to protect the wood layer against the effects of stretching because this does not occur, thereby precluding the necessity of using valuable strengthened wood layers, etc.; furthermore, obvious free movements facilitate the work process and allow the elimination of the preparation of the wood layer;

it is possible to press surfaces in undercut, reaching very high limits, by changing the plate or rubber sheet elasticity;

the finished panels, having been pressed under vacuum, come out completely dry thanks to the removal of the dampness from the steam of the glue caused during the gluing process, with the consequent advantage that pieces produced in this way do not undergo deformations and the painting is enhanced. Also, the work environment is free from pollution by noxious gas produced by the chemical reaction of the glue because the fumes are sucked in by the vacuum pumping system and ejected to the outside.

The above mentioned characteristics, contained in the annexed claims, will be understood better with the aid of the following detailed description of a preferred embodiment of the invention and in accordance with the illustrative representations of the three enclosed sheets of drawings.

BRIEF DESCRIPTION OF THE DRAWINGS

FIGS. 3 and 4 are schematic representations of a panel "P" whose upper and lateral surfaces are to be covered with a thin wood layer (veneer) "T" after glue has been smeared on the gluing surfaces;

FIG. 5 is the pressing step illustrating the lifting of the lower pressing plate by which the pressing of wood layer "T" against sheet "G" is carried out;

FIG. 6 is a schematic representation illustrating the pressing step in upper chamber "A" with overhanging flexible rubber sheet "G", and a vacuum forming in lower chamber "B" to recall the rubber sheet "G" to form and glue layer "T" around the lateral surfaces of panel "P";

BEST MODE FOR CARRYING OUT THE INVENTION

Figure 1:
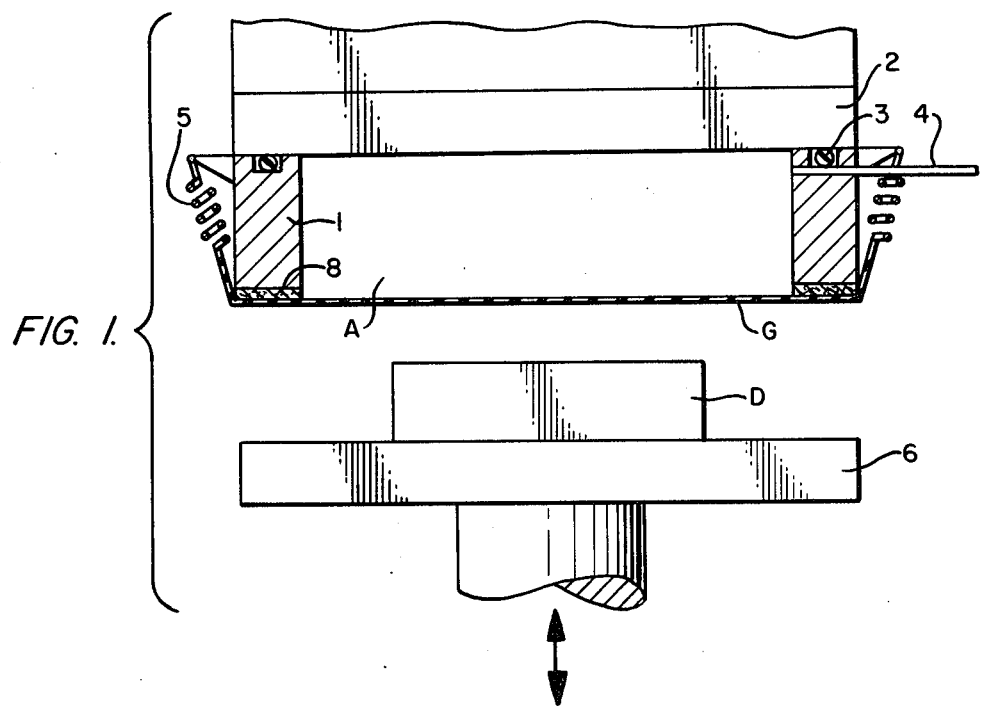
FIG. 1 is a schematic representation of a frontal elevation section view of the equipment applied to the press before the pressing stage.

Referring now to FIG. 1, press 10 comprises an airtight frame 1 having the shape of a box with an open bottom, and supplied with at least one piping 4 effecting a connection of the inner chamber "A" with exterior equipment for the passage of a fluid which can be put into or taken out of the chamber "A", either under pressure or vacuum with suitable means of pressure and vacuum formation (not shown).

Figure 2:
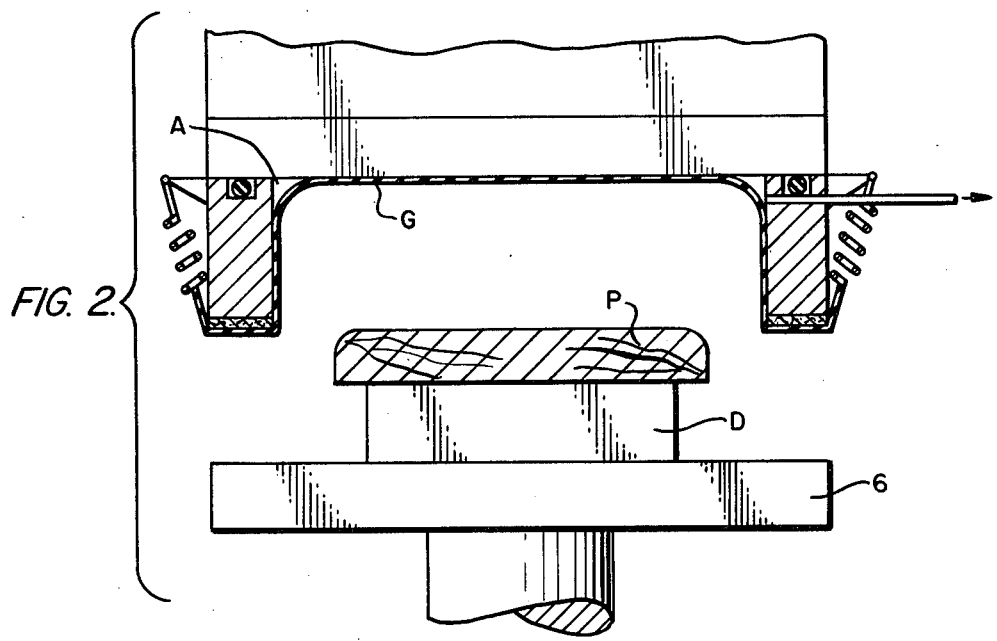
FIG. 2 is the schematic representation of the behavior of the rubber sheet "G" under a vacuum action applied to the upper chamber "A" but without showing the pressing of the wood layer to be glued to the panel "P"
Figure 7:
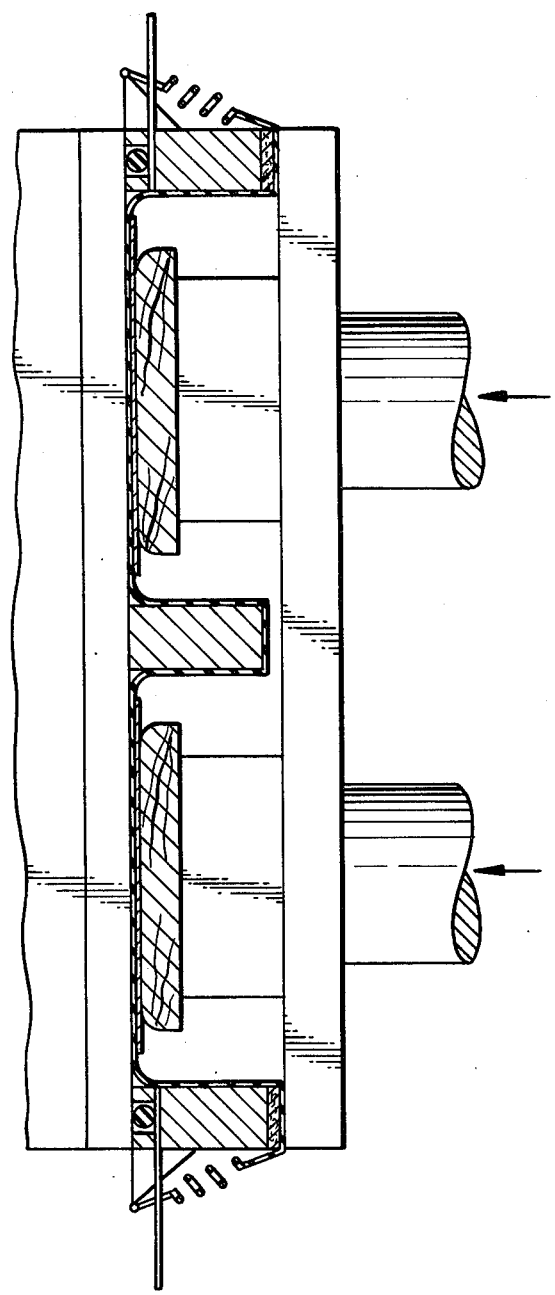
FIG. 7 is an embodiment with two flanked apparatuses, the apparatuses consisting of support means comprising a perimetrical airtight frame 1, fixing systems on the upper plate 2 of the press, and the intermediation of an airtight annular packing 3.

Through fixing and elastic stretching system 5, the perimeter of a flexible and elastic rubber sheet "G" is stretched over the bottom of the frame 1. Under a vacuum action effecting withdrawal of the air contained in chamber "A", the sheet "G" can be deformed as represented in FIG. 2 so that it elastically expands into perfect contact with the surface of the upper plate 2 of the press 10. The movable lower plate 6 of the press 10, which moves up and down for the pressing operation of FIG. 6, is supplied with a piping 7 communicating with the inner perimeter of chamber "A" defined by the inner perimeter of frame 1. On the movable lower plate 6 is a support "D" for panel "P". The upper and lateral external surfaces of panel "P" are to be covered with glue and a wood layer of flexible type "T" as represented in FIGS. 3 and 4. The piping 7 of the lower plate 6 is connected to well known pump means in order to create a vacuum in the lower chamber "B" after the pressing step of FIG. 5. The vacuum is created between the flexible rubber sheet "G" and the lower plate 6 as represented in FIG. 5 and through the vacuum action, the rubber sheet "G" is formed as represented in FIG. 6. The vacuum means is also suitable for operating in conjunction with the piping 4 of upper plate 2 as follows: creation of a vacuum in the lower chamber "B" by vacuum action in the piping 7 of lower plate 6 with free atmospheric pressure entering the upper chamber "A" or supra-atmospheric pressure in chamber "A" by means of inlet 4, accomplishing with such an operation the gluing of layer "T" to panel "P" under the temperature and pressure action as represented in FIG. 6.

More particularly, to obtain quick gluing and complete polymerization, the upper plate 2 of the press 10 is brought to a temperature of 95°–120° C. and in the same way the lower plate 6 of the press 10 is brought to the same or about the same temperature, more or less according to the specific requirements of an application.

With such a system, the heating of rubber sheet "G" is accomplished and the sheet will transmit heat to the wood layer "T" to be pressed, and lower plate 6 will transmit heat to the panel "P" to be glued.

A further system to accelerate the gluing is attained through the utilization of preheated air introduced through an inlet in a manner that accelerates the gluing and polymerzation system. The process steps are essentially:

when the apparatus is not operating, the press 10 is as represented in FIG. 1. The frame 1 fixed on upper plate 2 of the press 10 will hold the rubber sheet "G" well stretched through means of a packing 8 of lesser density;

before starting the production cycle, the vacuum in chamber "A" is created so that the rubber sheet "G" expands to contact the lower surface of upper plate 2 of the press, the plate 2 being heated to 95°–120° C. and thereby heating, through conduction due to direct contact, the rubber sheet "G";

in the meantime, the parts to be glued will be prepared as represented in FIGS. 3 and 4. Glue is smeared on the panel "P" or applied on the wood layer "T" with possible further smearing of glue also on the free lateral surfaces thereof, keeping in mind that the glue can be applied both to the rough panel to be covered and to the wood layer according to the specific requirements and the available equipment;

then the panel "P" with veneer "T" and their support "D" are placed on the lower plate 6 of the press system 10;

the lower pressing plate 6 is lifted to press and glue the two pieces "P" and "T" as represented in FIG. 5;

this portion of the pressing operation completed, atmosphere is introduced into the upper chamber "A" and a vacuum is created in the lower chamber "B", the atmosphere introduced being the inlet of hot fluid under pressure in upper chamber "A" as represented in FIG. 6, thus completing the pressing operation and gluing;

then the pressures are reversed to create again the vacuum in upper chamber "A", and the plates are separated so that the panel "P" with veneer layer "T" glued thereto can be removed with support "D".

It stands to reason that with the closing of the press 10, the two pieces to be glued (panel "P" and layer "T") are compressed between the two hot plates 2 and 6 of press 10 which is being heated. The pressure of machine 10 presses the wood layer "T" under the rubber sheet in such a way that the layer "T" cannot undergo stretching during the extension of rubber sheet "G" in areas other than the flat surfaces and consequently breakages cannot occur. This mechanical pressure will increase further the specific pressure on the flat surfaces of the pieces without increasing the necessary pneumatic pressures on the curved surfaces, thus allowing a reduction of the resistant moments of the frame. This also develops a leveling action on the flat surface of the panel "P", eliminating possible stagnations of glue, etc. After the closing of the press, the valves arranged and preprogrammed for the cycle will reverse the flow of the fluids in the chambers "A" and "B", thereby starting the steps of the gluing process which, as already mentioned above, is accomplished by the combined action of the pneumatic supra-atmospheric pressure in the upper chamber "A" and pneumatic vacuum in the lower chamber "B" together with the mechanical pressure on the flat part of the piece as shown in FIG. 6.

The rubber sheet "G", preheated by contact with the hot parts of the press, lies over the curved surfaces of the panel piece and conducts and transmits heat to the gluing surfaces of the piece through the overlying wood layer. At the same time, the compressed and preheated air in the upper chamber "A" contributes heat through the rubber sheet to the curved parts that do not receive heat from the heated upper plate 2, thereby reducing to a minimum the drying and hardening times of the glue.

The pressure of the compressed air will be regulated in accordance with the shape of the pieces and their number; nevertheless the value cannot exceed that of the setting of the highest pressure valve installed on the bag and which value will be calculated on the basis of the mechanical resistances offered by the frame.

For the step of opening the press, the automatically piloted electro-valves (not represented but of a well known type) will obviously intervene after a predetermined time to reverse the flow of the fluids in chambers "A" and "B" of the frame, and thereby retracting the rubber sheet to its starting position as above described for the condition preceding the pressing step. The step of preheating the rubber sheet will last the time necessary for discharging the glued pieces and smearing and introducing the new ones. After pressing the new pieces and resettling the pressure balances between chambers "A" and "B", another automatic control impulse will cause the opening of the press and thus conclude the pressing cycle, obviously to be followed by the discharge of the work pieces. Of course, all the execution details can be modified but without altering the innovative substance of the invention as described, illustrated and essentially claimed below.

INDUSTRIAL APPLICABILITY

The present invention can be utilized with veneering presses for adhering a thin layer to a variously shaped or flat surface.

What is claimed is:

1. A process for adhering thin layers onto variously shaped or flat surfaces by means of adhesive therebetween and a press having a heated upper pressing plate and frame, an elastic diaphragm enclosing an open end of said frame, and a heated lower pressing plate, comprising the steps of:
   (a) withdrawing medium from an interior cavity of said frame to retract said diaphragm into contact with said heated upper pressing plate and thereby heat said diaphragm;
   (b) disposing a thin layer and a surface on said heated lower pressing plate,
   (c) displacing said lower pressing plate into engagement with said diaphragm and frame whereby said thin layer and surface are pressed together by said upper and lower pressing plates,
   (d) simultaneously introducing medium into said cavity and evacuating medium from an area between said lower pressing plate and diaphragm to draw said diaphragm over the periphery of said layer and surface to effect a pressing therebetween,
   (e) reversing the process of step (d),
   (f) separating said lower pressing plate from said diaphragm and frame, and removing the pressed together layer and surface from said lower pressing plate, and
   (g) continuously repeating steps (b) through (f).

2. The process in accordance with claim 1, wherein the medium introduced into said cavity is heated medium at supra-atmospheric pressure.

3. The process in accordance with claim 2, wherein the heated medium at supra-atmospheric pressure, heat from said diaphragm, and heat transmitted by said lower pressing plate to said surface effect an expeditious drying of said adhesive.

4. The process in accordance with claim 1, further comprising the step of attaching said elastic diaphragm to said frame by resilient means.

5. In an apparatus for adhering a thin layer onto a variously shaped or flat surface by means of an adhesive therebetween, comprising a perimetrical frame having one end secured to an upper pressing plate to form an interior cavity, first inlet/outlet means communicating with said interior cavity, an elastic diaphragm enclosing a frame end opposite the one end of said frame, resilient means maintaining said diaphragm's position relative to said opposite end, a lower pressing plate for positioning said layer and surface, second inlet/outlet means communicating with the area above said lower pressing plate, means for heating said upper and lower pressing plates, means for providing vacuum or pressure to said first and second inlet/outlet means, and electro-pneumatic control means for selectively applying said vacuum or pressure providing means to said first and second inlet/outlet means, whereby medium in said cavity is removed so that said diaphragm expands and contacts said upper pressing plate and is heated thereby, said lower pressing plate engaging the diaphragm at said frame and said thin layer disposed over said surface pressed against said diaphragm and upper pressing plate, said pressing completed by the introduction of medium into said cavity and the removal of medium from said area whereby the periphery of said thin layer is pressed to said surface.

6. The apparatus in accordance with claim 5, wherein the medium introduced into said cavity comprises heated medium at supra-atmospheric pressure.

7. The apparatus in accordance with claim 5, wherein said means for providing vacuum or pressure comprises insulated container means, heat exchanger means, and vacuum/compressor pump means.

8. The apparatus in accordance with claim 5, further comprising perimetrical sealing means effecting an air tight seal between said frame and upper pressing plate.

9. The apparatus in accordance with claim 5, wherein said electro-pneumatic control means comprises electro-valve means and computer means for controlling the flow of medium through said first and second inlet/outlet means, including the alternative provision and withdrawal of medium to said cavity and area.

* * * * *